(12) United States Patent
Knowles et al.

(10) Patent No.: US 11,238,498 B2
(45) Date of Patent: Feb. 1, 2022

(54) SYSTEM AND METHOD FOR DISTRIBUTING MESSAGES TO AN ELECTRONIC DEVICE BASED ON CORRELATION OF DATA RELATING TO A USER OF THE DEVICE

(71) Applicant: BlackBerry Limited, Waterloo (CA)

(72) Inventors: Michael Knowles, Waterloo (CA); Bhavuk Kaul, San Francisco, CA (US); Sherryl Lee Lorraine Scott, Toronto (CA)

(73) Assignee: BlackBerry Limited, Waterloo (CA)

( * ) Notice: Subject to any disclaimer, the term of this patent is extended or adjusted under 35 U.S.C. 154(b) by 5 days.

(21) Appl. No.: 16/685,472

(22) Filed: Nov. 15, 2019

(65) Prior Publication Data

US 2020/0151770 A1 May 14, 2020

Related U.S. Application Data

(63) Continuation of application No. 12/776,733, filed on May 10, 2010, now abandoned.

(30) Foreign Application Priority Data

Apr. 27, 2011 (CA) .................................. CA 2738261

(51) Int. Cl.
*G06Q 30/02* (2012.01)
*H04L 12/58* (2006.01)
*H04W 4/02* (2018.01)

(52) U.S. Cl.
CPC .......... *G06Q 30/0266* (2013.01); *G06Q 30/02* (2013.01); *G06Q 30/0261* (2013.01);
(Continued)

(58) Field of Classification Search
CPC ........... G06Q 30/0266; G06Q 30/0261; G06Q 30/02; H04L 51/20; H04L 51/38; H04L 51/14; H04W 4/027
See application file for complete search history.

(56) References Cited

U.S. PATENT DOCUMENTS 6,353,398 B1 3/2002 Amin et al.
6,553,313 B1 4/2003 Froeberg
(Continued)

FOREIGN PATENT DOCUMENTS

| CN | 101184266 A | 5/2008 | |
|---|---|---|---|
| WO | 2008052356 | 5/2008 | |
| WO | WO-2008052356 A1 * | 5/2008 | ............. H04L 67/18 |

OTHER PUBLICATIONS

"How your iPhone could know when you're in a moving car" (Verger, Rob published Jun. 7, 2017 on PopularScienve.com) (Year: 2017).*

(Continued)

*Primary Examiner* — James M Detweiler
(74) *Attorney, Agent, or Firm* — Conley Rose, P. C.; J. Robert Brown, Jr.

(57) ABSTRACT

The present disclosure described herein relates to a system and method for distributing messages to an electronic device. The method comprises: analyzing data relating to the device to determine a correlation of data relating to a user of the device; selecting an advertisement from a set of advertisements based on the correlation of data; and transmitting the advertisement to the device. The correlation of data may be determined from analyzing movement data and at least one status indicator relating to the device.

20 Claims, 8 Drawing Sheets

(52) U.S. Cl.
CPC ......... *G06Q 30/0269* (2013.01); *H04L 51/20* (2013.01); *H04W 4/027* (2013.01); *H04L 51/14* (2013.01); *H04L 51/38* (2013.01)

(56) References Cited

U.S. PATENT DOCUMENTS

| | | | |
|---|---|---|---|
| 7,092,724 B2 | 8/2006 | Fellenstein et al. | |
| 7,129,825 B2 | 10/2006 | Weber | |
| 8,180,371 B1* | 5/2012 | Izdepski | H04W 64/006 455/456.1 |
| 8,195,133 B2* | 6/2012 | Ramer | G06F 16/9577 455/414.1 |
| 8,255,154 B2* | 8/2012 | Zilka | H04W 4/48 701/408 |
| 8,280,438 B2* | 10/2012 | Barbera | H04M 1/72577 455/557 |
| 2002/0161657 A1* | 10/2002 | Kojac | G06Q 30/02 705/26.1 |
| 2002/0194246 A1 | 12/2002 | Moskowitz et al. | |
| 2003/0046164 A1* | 3/2003 | Sato | H04L 67/306 705/14.66 |
| 2004/0192351 A1 | 9/2004 | Duncan | |
| 2004/0198386 A1* | 10/2004 | Dupray | H04W 64/00 455/456.1 |
| 2006/0068840 A1* | 3/2006 | Sherman | G08G 1/123 701/1 |
| 2007/0050248 A1* | 3/2007 | Huang | G06Q 30/0265 705/14.62 |
| 2007/0287437 A1 | 12/2007 | Cartmell | |
| 2008/0045236 A1 | 2/2008 | Nahon et al. | |
| 2008/0214156 A1* | 9/2008 | Ramer | G06F 16/68 455/414.1 |
| 2009/0049119 A1* | 2/2009 | Marcinkiewicz | H04L 67/06 709/203 |
| 2009/0163243 A1* | 6/2009 | Barbera | H04M 1/72569 455/557 |
| 2009/0199107 A1* | 8/2009 | Lewis | G06Q 30/0269 715/745 |
| 2009/0328087 A1* | 12/2009 | Higgins | H04L 67/06 725/10 |
| 2010/0251283 A1* | 9/2010 | Smith | H04L 65/4084 725/25 |
| 2010/0332315 A1* | 12/2010 | Kamar | G06Q 30/02 705/14.46 |
| 2011/0276401 A1 | 11/2011 | Knowles et al. | |

OTHER PUBLICATIONS

Canadian Examination Search Report dated Sep. 25, 2017 for Canadian Patent Application No. 2738261.
Canadian Office Action dated Oct. 31, 2016, received for Canadian Application No. 2738261.
Canadian Office Action dated Sep. 15, 2014, received for Canadian Application No. 2738261.
Chinese Office Action dated Apr. 2, 2014, received for Chinese Application Serial No. 201110112941.0.
European Office Action dated Jun. 4, 2014 for European Application No. 1066729.3.
Chinese Office Action dated Jul. 10, 2013, received for Chinese Application Serial No. 201110112941.0.
Chinese Office Action dated Oct. 30, 2013, received for Chinese Application Serial No. 201110112941.0.
Chinese Office Action dated Nov. 28, 2012, received for Chinese Application Serial No. 201110112941.0.
Eichler, Gerald et al. "Context Information as Enhancement for Mobile Solutions and Services." ICIN 2009: 13th International Conference on Intelligence in Next Generation Networks. IEE. Oct. 26, 2009, Piscataway, NJ, USA.
Komninos, Andreas et al., me-Commerce: An Infrastructure for Personal Predictive Mobile Commerce. Proceedings of the International Conference on Mobile Business, Jun. 26-27, 2006 in Copenhagen, Denmark.
Hristova, Nataliya et al. Ad-me: Wireless Advertising adapted to the User Location, Device and Emotions. Proceedings of the 37th Hawaii International Conference on System Sciences, Jan. 5-8 on the Big Island, Hawaii, USA.
Figge, Stefan et al. 2003. SG "ad" Work—3G's Breakthrough With Mobile Advertising. Proceedings of the 8th International Workshop on Mobile Multimedia Communications (MOMUC), Oct. 5-8 in Munchen, Germany.
Gkekas, Georgios et al., A Smart Calendar Application for Mobile Environments. Proceedings of the 3rd International Mobile Multimedia Communications Conference, Aug. 27-29 in Nafpaktos, Greece.
Kolmel, Bernhard and Spiros Alexakis. 2002. Location Based Advertising. Proceedings of the 1st International Conference on Mobile Business, Jul. 8-9 in Athens, Greece.
Canadian Office Action dated Sep. 25, 2017, received for Canadian Application No. 2738261.
Canadian Office Action dated Jul. 10, 2013, received for Canadian Application No. 2738261.
Office Action dated Oct. 26, 2012; U.S. Appl. No. 12/776,733, filed May 10, 2010; 17 pages.
Final Office Action dated Jun. 7, 2013; U.S. Appl. No. 12/776,733, filed May 10, 2010; 16 pages.
Advisory Action dated Sep. 13, 2013; U.S. Appl. No. 12/776,733, filed May 10, 2010; 2 pages.
Office Action dated Apr. 29, 2015; U.S. Appl. No. 12/776,733, filed May 10, 2010; 13 pages.
Final Office Action dated Oct. 22, 2015; U.S. Appl. No. 12/776,733, filed May 10, 2010; 16 pages.
Advisory Action dated Feb. 3, 2016; U.S. Appl. No. 12/776,733, filed May 10, 2010; 2 pages.
Office Action dated Jul. 15, 2016; U.S. Appl. No. 12/776,733, filed May 10, 2010; 16 pages.
Final Office Action dated Dec. 20, 2016; U.S. Appl. No. 12/776,733, filed May 10, 2010; 16 pages.
European Extended Search Report; Application No. 10166729.3; dated Oct. 13, 2010; 7 pages.

* cited by examiner

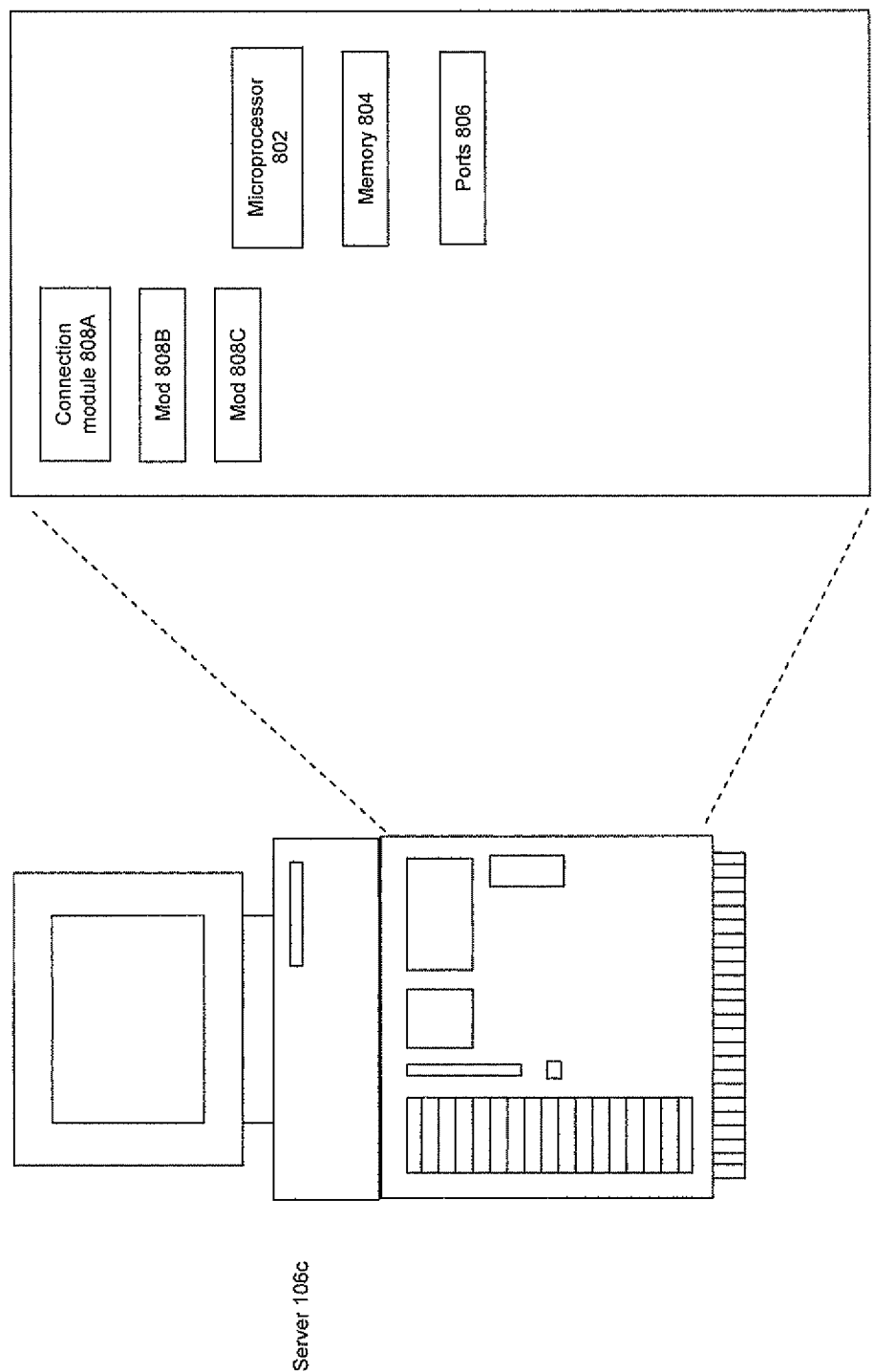

SYSTEM AND METHOD FOR DISTRIBUTING MESSAGES TO AN ELECTRONIC DEVICE BASED ON CORRELATION OF DATA RELATING TO A USER OF THE DEVICE

FIELD OF DISCLOSURE

The disclosure described herein relates to a system and method for distributing messages and/or content to an electronic device, such as a mobile electronic communication device.

BACKGROUND

Currently, advertisements and other messages are transmitted to a mobile communication device. The number of advertisements provided can be overwhelming to the user of the device. Advertisements are provided to the device without consideration as to the recipient.

There is a need for a system and method which addresses these deficiencies.

BRIEF DESCRIPTION OF THE DRAWINGS

Embodiments of the present disclosure will now be described, by way of example only, with reference to the accompanying drawings, in which:

FIG. 8 is a block diagram of components of an advertisement server of FIG. 1.

DETAILED DESCRIPTION OF AN EMBODIMENT

Figure 1:
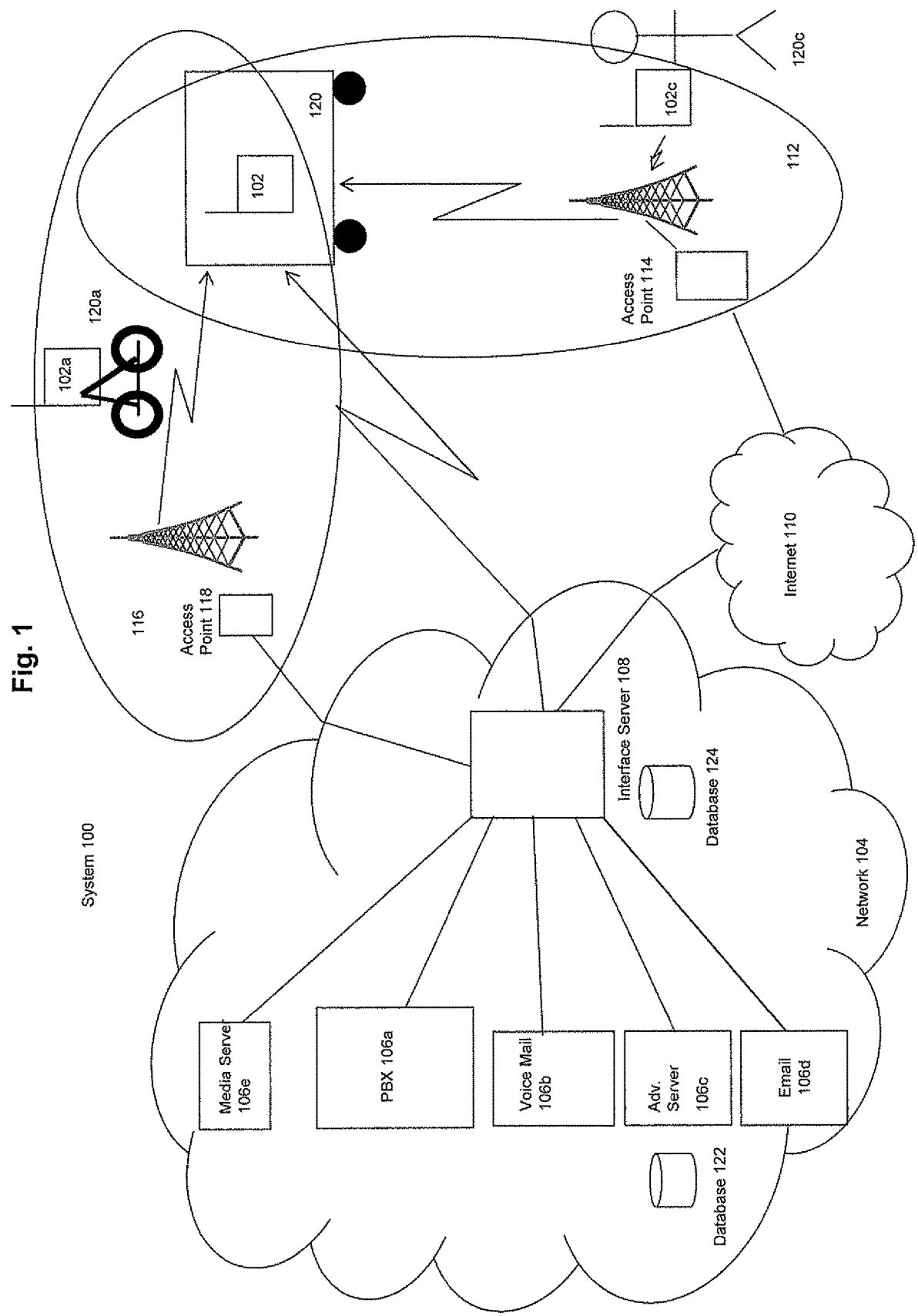
FIG. 1 is a schematic diagram of a device in communication with a communication network, where the network includes an advertisement server that provides communications to the device in an embodiment.

The description which follows and the embodiments described therein are provided by way of illustration of an example or examples of particular embodiments of the principles of the present disclosure. These examples are provided for the purposes of explanation and not limitation of those principles and of the present disclosure. In the description which follows, like parts are marked throughout the specification and the drawings with the same respective reference numerals.

In a first aspect, a method for distributing messages to an electronic device is provided. The method comprises: analyzing data relating to the device to determine a correlation of data relating to a user of the device; selecting a media, such as an advertisement from a set of advertisements, based on the correlation of data; and transmitting the advertisement to the device. The correlation of data may be determined from data stored in/associated with the device.

In the method, the correlation of data may be determined from analyzing movement data and at least one status indicator relating to the device.

In the method, after transmitting the advertisement to the device, the advertisement may be generated on the device.

In the method, the correlation of data may be determined using a speed of the device determined from the state of movement. In the method, the state of movement may be determined from comparing the movement data against a threshold to determine a speed of the device. In the method, if the speed exceeds the threshold then the advertisement may include an audio component; and if the speed does not exceed the threshold then the advertisement may provide audio and visual components.

In the method, if the status indicator indicates that the device is associated with a driver of a vehicle then the advertisement may include an audio component.

In the method, the status indicator may be a status of a communication connection between the device and the vehicle.

In the method, if the status indicator indicates that the device is associated with a passenger associated with the driver then the advertisement may differ from a second advertisement sent to a second device associated with the driver.

In the method, the status indicator may be a status of a communication connection between the device and the second device.

In the method, the advertisement may include a visual component and the second advertisement may not include a visual component.

In the method, the movement data may be provided from one or more of an accelerometer, global positioning system (GPS) data, and communication strength signals, provided from the device.

In the method, the status indicator may be data from a calendar application operating on the device.

In the method, the indicator may be time data associated with the device.

In the method, the correlation of data may include a user of the device being at work and not at work.

In the method, the correlation of data may include a user of the device being at home and not at home.

In a second aspect, a system for distributing messages to an electronic device is provided. The system comprises: an analysis module to determine a correlation of data relating to a user of the device by analyzing movement data and at least one status indicator relating to the device; a media selection module (which may be an advertisement selection module) to select an advertisement from a set of advertisements based on the correlation of data; and a transmission module to transmit the advertisement to the device.

In the system, the data analysis module may further utilize a speed of the device determined from the state of movement to determine the correlation of data.

In the system, the data analysis module may further compare the movement data against a threshold to determine a speed of the device to determine the state of movement.

In the system, if the speed exceeds the threshold then the advertisement selection module may select an advertisement that includes an audio component; and if the speed does not exceed the threshold then the advertisement selection module may select an advertisement having audio and visual components.

In the system, if the status indicator indicates that the device is associated with a driver of a vehicle then the advertisement selection module may select an advertisement that includes an audio component.

In the system, the status indicator may be a status of a communication connection between the device and the vehicle.

In the system, if the status indicator indicates that the device is associated with a passenger associated with the driver then the advertisement selection module may select an advertisement that differs from a second advertisement that is sent to a second device associated with the driver.

In the system, the indicator may be a status of a communication connection between the device and the second device.

In the system, the advertisement may include a visual component and the second advertisement does not include a visual component.

In the system, the movement data may be provided from one or more of an accelerometer, global positioning system (GPS) data, and communication strength signals, provided from the device.

In the system, the status indicator may be data from a calendar application operating on the device.

In the system, the status indicator may be time data associated with the device.

In the system, the correlation of data may include a user of the device being at work and not at work.

In the system, the correlation of data may include a user of the device being at home and not at home.

The system may be provided in a server in a network in communication with the device.

In other aspects, various combinations of sets and subsets of the above aspects are provided.

Generally, an embodiment provides a device, system and method to distribute and manage communications that are provided to an electronic device, such as, but not limited to, a (portable) wireless communication device, a laptop computer or a personal computer. A communication can be any media, such as an advertisement. Generally an advertisement may contain any one or more of a text message, indicator, graphic, sound or other audio/visual content. An advertisement may be provided to the device in various forms and media, including as a message (for example, an email, a text message, or a voice mail message), as an embedded link in a website page that is accessed to the device, as a streamed content to the device. Also, an advertisement may be embedded and/or integrated into an application such that the advertisement is generated on the device without any request or further action required by a user of the device. For example, an advertisement may be generated as a visual output within a web page or as an output while an application is operating (e.g. as a banner during a telephone call). For the sake of convenience, and not limitation, the terms "advertisement" and "message" as used herein include any data or communication that is provided to the device. A purpose of distributing the advertisement may be to promote a particular ware, service or event. An advertisement may be provided through one or more servers logically connected to the network. However, an advertisement may also be provided from other devices in the network. A message may include any communication between devices that includes an advertisement.

One feature of an embodiment provides a format of a media, such as an advertisement, to a device depending on a current state of mind determined for a user of the device. An embodiment determines the user's state of mind based on a correlation of data relating to the user and/or the device, such including data relating to one or more of the location of the device, the direction of movement of the device, the detected speed of the device, recipients of recent communications in any form, calendar entries for applications operating on the device, etc. As noted, one context for a state of mind may be associated with a state of movement of the device. For example, a user of the device may carry it when the user is walking, jogging, riding a bicycle, in a car, on a train, etc. Additional contexts may be provided from status indicators provided from the device. As noted, the status indicators may be taken from data generated/updated by applications operating on the device, such as calendar applications, global positioning system (GPS) data, and preference data stored in the user's general environment settings (e.g. current time zone, home telephone number, name, gender, preferred backgrounds for graphical user interface (GUI), etc.). Different advertisements may be sent to the device depending on what the user is doing. As such, if the user of the device is walking, an advertisement relating to walking shoes may be provided to the device may be tailored to that deemed "state of mind". If the user of the device is at a desk, running or in a car, the type of an advertisement provided to the device may be tailored to those states of mind.

Further for a given advertisement (e.g. from a telephone company), different formats of an advertisement for a campaign may be provided and depending on the correlation of data determined (which may be used to indicate the state of mind of the user), a particular format of an advertisement from the campaign may be provided to the device. For example, if it is determined that the user of the device is currently driving a car, an advertisement may not be provided to the device. Alternatively, if it is determined that the user of the device is a passenger in the same car, then another format of the advertisement providing audio and visual features may be provided to the device. Alternatively still, the user is at a desk, then one format of an advertisement (e.g. audio only) may be provided to the device.

The state of movement of the device provides one set of data that can be used to determine the correlation of data relating to the user. Again, the correlation of data may indicate the state of mind of the user. Additional data may also be analyzed, such as parameters, settings and application data associated with that user that are stored in the device. The determined correlation of data can be overridden by default settings, which may be set by parameters in the device or a server providing advertisements to the device. As such a different advertisement or a different format of an advertisement (or no advertisement) may be provided to the device. An embodiment may finesse an advertisement selection algorithm based on what advertisement/format had initially been selected and what advertisement/format is actually provided to the device. As such, an embodiment can learn what advertisements/formats are appropriate to for a determined correlation of data for the device, which may be used to indicate the state of mind of the user. As iterations of the algorithm and refinements of advertisement selections are provided, the selected advertisements/formats provided to the device become more appropriate for user of the device.

In one embodiment, advertisements are provided to a device through a network. The advertisements are processed by an application or module provided in software, firmware or hardware on an advertisement server in the network. Alternatively, the advertisements may be stored and processed in the device. Additionally, aspects of the application and module can be split between the device and one or more servers. An embodiment can track an environment and operating conditions of the device based on an analysis of data stored by and signals received by the device. The environment and operating conditions may include data relating to the time of day, the location/movement of the device, the communication links currently established with the device (such as, but not limited to recent emails, text messages, instant messages and voice calls both to and from the device), the detected light around the device, etc. In addition, an embodiment may obtain and use network presence information regarding other devices in the network. An embodiment may also use scheduling and calendar information relating to the device.

First, a description is provided of a network and an exemplary communication device that has access to servers in the network, including an advertisement server, according to an embodiment. Thereafter, specific features of an embodiment are discussed.

Referring to FIG. 1, system 100 shows device 102 in communication with network 104. Device 102 is a communication device having one or both data and voice communication capabilities; it may be a multiple-mode device capable of voice, data and other types of communications. Device 102 may be a wireless handheld device, cell phone, smart phone, personal digital assistant (PDA), and/or computer (either desktop or portable) having a (wireless) network card, network adapter and/or network interface controller (NIC) installed therein.

Device 102 may include a movement detection module (described later), which may incorporate an accelerometer. In addition to detecting motion, an accelerometer may be used to determine speed and acceleration of device 102. Device 102 may also have a global positioning system (GPS) module (described later) that receives signals from one or more satellites, thereby allowing a location of the device to be calculated using triangulation techniques. Notably, location and speed data for device 102 may be determined based on the received location signals, such as those from a GPS module, using methods and applications known in the art.

Device 102 may have radio frequency identification (RFID) capabilities, and thus device 102 may include an RFID transponder and/or an RFID reader. RFID uses radio waves to automatically identify objects, which may be done in several ways. An exemplary identification technique stores identification data, which may include a serial number, that identifies device 102 on a storage device, such as a microchip, that is in communication with the RFID transponder inside device 102. An RFID reader enables an RFID transponder that is within the RFID reader's range to transmit the stored identification data to the RFID reader. The range of an RFID reader may depend on its power output and the radio frequency used. The RFID reader may receive and convert the radio waves transmitted by the RFID transponder into digital information which may then be processed by a processor on device 102 or a related server.

Device 102 may further include a short-range communication sub-system that enables communication between device 102 and other proximate systems or devices, which need not necessarily be similar devices. For example, the short-range communication sub-system may include an infrared device and associated circuits and components, or a Bluetooth (trade-mark) communication module to provide for communication with similarly enabled systems. Further details on components of device 102 are provided hereinbelow.

Returning to FIG. 1, device 102 is shown in system 100 as communicating with several networks, each of which may be implemented in any known network architecture topology. Exemplary networks are described below.

Network 104 provides a suite of applications, services and data to its connected devices (e.g., device 102) through its associated servers 106a, 106b, 106c (collectively "application servers 106"). Interface server 108 is provided as one common collection and communication point for application servers 106 to components outside of network 104. Devices (such as device 102) connect to network 104 through wireless connections or through an external connection through Internet 110.

Wireless network 112 provides another communication link for device 102 to network 104. Network 112 also provides communications between device 102 and device 102b. Wireless network 112 may be a data-centric network, a voice-centric network, or a dual-mode network. In one embodiment, wireless network 112 is implemented as a Wi-Fi network generally following standards set by the IEEE LAN/MAN Standards Committee, known as IEEE 802, through its working group "11". The 802.11 standard defines media access control (MAC) and physical (PHY) layers in the Open Systems Interconnection (OSI) protocol model for WLAN. Wireless network 112 includes an antenna and supporting radio transmission equipment known to those skilled in the art. Access point (AP) 114 is shown in network 104 and in an embodiment AP 114 is an IEEE 802.11 radio receiver/transmitter (or transceiver) and functions as a bridge between network 112 and network 104.

Cellular network 116 provides device 102 with another communication network allowing it to communicate with network 104. The coverage area of network 116 may overlap with the coverage areas of network 112. Cellular network 116 provides voice and data services to devices 102. Data-centric technologies for cellular network 116 include the Mobitex (trademark) Radio Network ("Mobitex") and the DataTAC (trademark) Radio Network ("DataTAC"). Voice-centric technologies for cellular network 116 include Personal Communication Systems (PCS) networks like Global System for Mobile Communications (GSM) and Time Division Multiple Access (TDMA) systems. Certain networks provide multiple systems. For example, dual-mode wireless networks include Code Division Multiple Access (CDMA) networks, General Packet Radio Service (GPRS) networks, and so-called third-generation (3G) networks, such as Enhanced Data rates for Global Evolution (EDGE) and Universal Mobile Telecommunications Systems (UMTS). Other network communication technologies that may be employed include, for example, Ultra Mobile Broadband (UMB), Evolution-Data Optimized (EV-DO), High Speed Packet Access (HSPA), Evolved High Speed Packet Access (HSPA+), etc. Access point 118 may provide an interface communication point between network 116 and network 104.

As noted an embodiment provides tailored communications to a device, such as device 102, depending on a determined correlation of data relating to a user associated with the device. This correlation may be used to indicate a "state of mind" of the user. As an example, device 102 is shown in three different environments in FIG. 1, which may be used, in part, to indicate particular states of mind for the user of device 102. Each environment is discussed in turn.

First, device 102 is shown as being located in vehicle 120. As such, the user of device 120 is either the driver of vehicle 120 or a passenger. Vehicle 120, in its normal operation, drives in urban environments, such as on defined roads and highways in and between towns and cities. Vehicle 120 may be driven in non-urban environments such as on logging roads, in forests and along waterways. On the determination that device 102 is in vehicle 120, this environment provides one context for advertisements for device 102. For example, for this context, advertisements may be related to automobiles, food, gasoline and other items relating to automobiles, food, supplies and services for automobiles. Other passengers in vehicle 120 may also have devices 102 (not shown) etc. As such vehicle 120 (or a train, plane, boat) may have a collection of devices 102 therein. Another context that may be provided upon the determination that device 102 is in vehicle 120, is whether the device is associated with a driver or a passenger (and which passenger) of vehicle 120. Other passengers in vehicle 120 may also have devices 102 (not shown) etc. Contexts of "friends" may be made among occupants (driver and sets of passengers) in a vehicle. An embodiment may distinguish between deemed passengers in a vehicle and a driver of the vehicle. In some advertisement campaigns, passengers in a vehicle may be a preferred target audience than the driver, as passengers may have more time and less distractions to receive and review advertisements. As such vehicle 120 (which may be a car, train, plane, boat, etc.) may have a collection of devices 102 therein.

Second, system 100 also shows device 102, now noted as device 102a, that is located on bicycle 120a. As such, the user of device 102a is typically the operator of bicycle 120a (although on a tandem bicycle, the user may be a passenger). Bicycle 120a, in its normal use, is pedalled in urban environments, such as on defined roads and highways in and between towns and cities. Bicycle 120a may be ridden in non-urban environments such as on trails and in fields. On the determination that device 102a is with bicycle 120a, this environment provides another context for advertisements for device 102a. For example, for this context, advertisements may be related to health issues, food, bicycle and fitness equipment and other items relating to bicycles ad health issues.

Third, system 100 also shows device 102, now noted as device 102c, as being carried by user 120c. User 120c may be walking, jogging, standing, sitting at a desk, eating in a restaurant, exercising at a gym, at home watching television, etc. On the determination that device 102c is with user 120c, this environment provides yet another context for advertisements for device 120c. For example, for this context, advertisements may be related to walking, work, shoes, clothes and other items relating to an individual in general. User 120c may be walking with another user, having a separate device 102 (not shown).

Turning to network 104, further detail is provided on exemplary application servers 106 therein. Each server may communicate directly with elements communicating within network 104 (such as device 102 and other application servers 106).

Private Branch Exchange (PBX) server 106a provides a messaging client allowing device 102 to establish local voice and data transmissions within network 104 and with exterior devices and networks. PBX server 106a provides a connection with a PSTN (not shown) for routing incoming and outgoing voice calls for network 104 and its associated enterprise. On one side, PBX server 106a is connected to an external telephone system, such as the PSTN, via direct inward dialling (DID) trunks. In an embodiment, PBX server 106a may use ISDN signalling protocols for establishing and breaking circuit-switched connections through the PSTN and related signalling and communications.

Voice mail server 106b provides storage, retrieval and processing of voice mail data files which may be processed by PBX server 106a or a VoIP (Voice over Internet) system (not shown) associated with network 104. Voice mail server 106b may also notify the user when a voice mail message is left in his mailbox.

A media server, such as advertisement server 106c, provides storage and forwarding of advertisements to devices, such as device 102, and/or servers in network 104. The advertisements, in one example, are received from one or more advertising networks (not shown) in communication with the advertisement server 106c. Advertisement server 106c provides a platform that gathers environment data from devices 102, such as data on the current motion of devices 102, and selectively identifies and distributes forms of advertisement to devices 102 and/or servers in network 104. Database 122 may be associated with server 106c.

Email server 106d provides storage, retrieval and processing of emails, SMS, MMS and other data files which may be processed by network 104. Other application servers 106 (not shown) may be provided (e.g. video streaming servers, etc.).

As a common point of interface between elements in network 104 and external elements, such as device 102, interface server 108 is provided that communicates within network 104 with each application server 106 and provides a "gateway" interface connection to external entities, such as device 102, network 116 and network 112. In one embodiment, all communications between device 102 and application servers 106 are processed through interface server 108. Each application server 106 may have an independent connection to the external entities as well. Database 124 is associated with interface server 108 and may contain configuration data for devices 102 and application servers 106, allowing communications to be conducted through application server 106. It will be appreciated that in some configurations, interface server 108 is provided as a logical entity that may contain several modules responsible for various aspects of the interface with the devices 102, such as email processing, web browsing processing, advertising, attachment serving, etc.

With components of an exemplary network identified, further detail is provided on notable features of embodiments.

Figure 2:
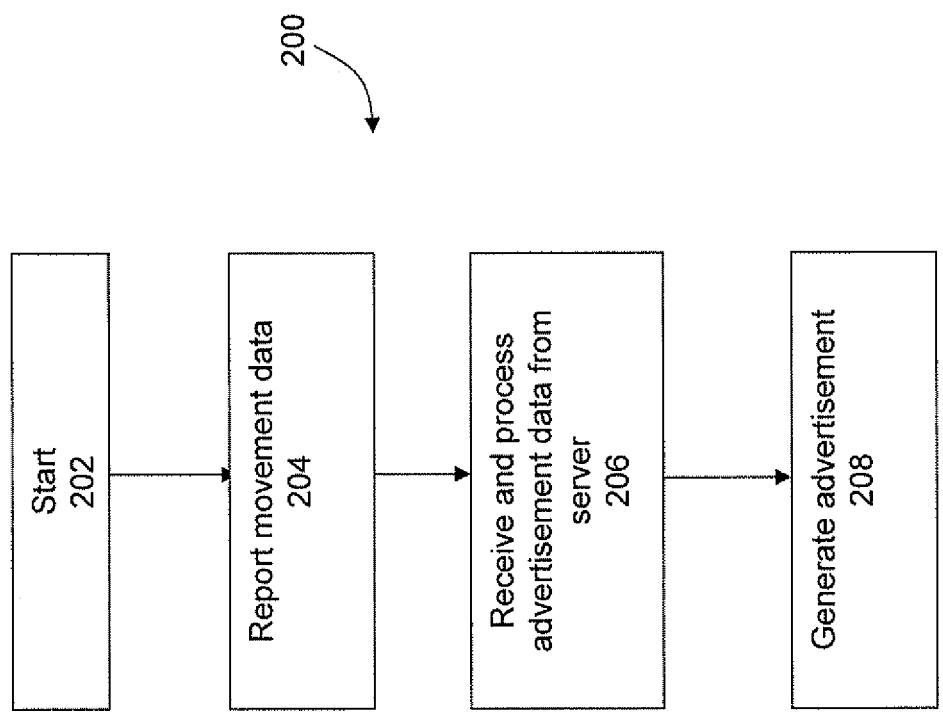
FIG. 2 is a flowchart of exemplary processes executed by the device of FIG. 1, as it receives communications from the advertisement server.

One embodiment provides a "push"-based advertisement distribution system. Referring to FIG. 2, flow chart 200 illustrates an exemplary progression of actions that device 102 executes as it determines (or has determined for it) a derived correlation of data for its user, and subsequently receives and displays an advertisement relating to the correlation of data. The process begins at block 202. Therein, device 102 is operating in a "normal" fashion and is in communication with network 104. Next, in block 204, device 102 analyzes and reports the correlation data to advertisement server 106c, via interface server 108. The reporting of data may be initiated from a request from server 106c or may be initiated by device 102 upon a (self) detection of its correlation of data. This process may operate as a background process in device 102. State of mind and/or correlation of data analysis may include evaluating movement data associated with device 102 and may utilize any one or more of the following data relating to device 102: current status information (e.g. battery level, status of communication links, etc.), data in calendar and appointment applications, preferences set in device 102, time of day, location, last recorded events/applications, movement data of device 102.

Movement data may include speed, direction of travel, etc., which device 102 may determine or deduce from its sensors and modules (such as a movement detection module, described later). Movement data may also be in the form of unprocessed data obtained from at least one of the aforementioned sources such that the data is subsequently processed by advertisement server 106c.

Once the correlation of data analysis is complete, server 106c selects an appropriate format of an advertisement and/or an appropriate advertisement and sends it to device 102. The determined current correlation of data may also cause certain advertisements to be blocked from being provided to device 102. At block 206, device 102 receives advertisement data from advertisement server 106c via interface server 108. Thereafter, applications operating on device 102 then generate the format of the advertisement on device 102. Advertisement data may be provided as one of, or a combination of, the following data formats: video (e.g. .mpg, .avi, .flv, .rm, .wmv, etc.), image (e.g. jpg, .tif, .gif, etc.), audio (e.g. .mp3, .ra, .wav, .wma, etc.), html, flash, etc. At block 208, device 102 generates the received advertisement data according to the particular format of the data (e.g. video, audio, image, all). Depending on the advertisement data received, device 102 may display an advertisement image on its display either with or without audio, display an advertisement video with or without audio, or play only an audio advertisement through its speakers. Device 102 may provide tracking data to advertisement server 106c when the advertisement is being generated or has been generated on device 102 for advertisement tracking purposes. This tracking data may be sent to another server.

It will be appreciated that in other embodiments, one or more of the processes of FIG. 2 may be performed by applications that are remote to device 102.

In an embodiment, movement data for device 102 may be determined in a number of ways, including monitoring signals from the movement detection module of device 102, signals from the global positioning system (GPS) module of device 102, changes in strength of cellular network signals received by device 102, changes in satellite feeds received by device 102, etc. In yet another embodiment, device 102 may be connected to vehicle 120 via wire or wireless connection, such as Bluetooth (trade-mark), and device 102 may obtain movement information from the vehicle.

In another embodiment, a correlation of data analysis relating to a user of device 102 may be set via an active (hardware/software) switch provided in device 102 through which a user of device 102 may change a setting to a different "state of mind" for device 102 (e.g. busy, personal time, at work, in transit, etc.).

In one embodiment, device 102 may be able to provide different contexts for its detected state(s) of mind. As noted earlier, device 102 is located in vehicle 120, device 102a is associated with bicycle 120a and device 102b is associated with user 120b. Each of device 102, 102b and 102c have different "states of mind" contexts based on the current location of the device.

Additional data, such as location, movement, time and availability data may be used to determine a correlation of data context.

An embodiment may filter different advertisements to be provided to a particular device 102 depending on its state of mind context.

In an embodiment, device 102 may be provided with a set of alternative advertisements and may select which one or more advertisements from the set to be generated on device 102. The selection may be based on an analysis of various factors and detected conditions, such as content of an advertisement, the current location of device 102, the detected speed of device 102, the direction of travel of device 102, and any preset preferences of the user of device 102.

Also, an advertisement provided to device 102 and the type of output generated may depend on a given state of mind context. For example, if there is a connection between device 102 and vehicle 120, then device 102 may output the audio component of an advertisement through speakers of vehicle 120. Also, a given advertisement may be provided to device 102 promoting a given ware, service or event when device 102 is within a given proximity to an associated store, building, theatre, etc. In another embodiment, when device 102 is located in vehicle 120 a determination may be made as to whether device 102 is associated with a driver of vehicle 120 or a passenger in the vehicle. The determination may be made by analyzing whether a Bluetooth (trade-mark) connection has been made between electronics in vehicle 120 and device 102. Alternatively, a software setting may be provided and set to indicate whether device 102 is associate with the driver or a passenger. Accordingly, when an advertisement is provided to device 102, if device 102 is associated with the driver one format of an advertisement may be provided (e.g. audio only) for safety reasons. Formats of advertisements for the driver may be directed from device 102 to vehicle 120 to its output features (e.g. its main speakers in the car). If device 102 is associated with a passenger, then another format of the advertisement may be provided (e.g. video with a map and audio). As such, there is a coordination of forms of advertisements provided to the devices 102 in vehicle 120.

If a detected correlation of data changes from its present state while an advertisement is generated on device 102, a further update message may be sent from device 102 to server 106c and subsequently, server 106c may send a command to stop sending or generating the advertisement or replace the advertisement with another one. Alternatively, the original advertisement provided to device 102 may have a conditional trigger condition flag that is used to determine whether the advertisement is generated on device 102. Device 102 may check the status of the flag and/or cause it to be updated depending on the current detected conditions of device 102.

Figure 3:
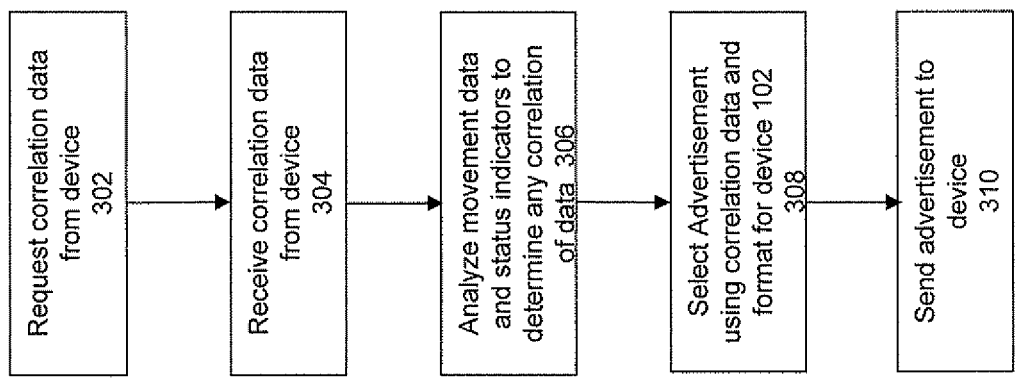
FIG. 3 is a flowchart of exemplary processes executed by the advertisement server of FIG. 1, as it sends communications to the device.

Referring to FIG. 3, flow chart 300 provides an exemplary progression of processes that advertisement server 106c executes when determining when and what advertisement to provide to device 102. At process 302 advertisement server 106c may request correlation data from device 102 via interface server 108. In another embodiment, device 102 may independently send correlation data to sever 106c. At process 304, advertisement server 106c receives correlation data from device 102. The correlation data transmitted by device 102 may already be in a format that is readable by advertisement server 106c or the data may require processing by interface server 108 and/or advertisement server 106c. The data may include any information, including connection status information for connections to any other thing or network (e.g. vehicle 120, network 116 or another device 102 (not shown)), information regarding the location of device 102 (e.g. through GPS data, through analysis of connection data from networks, including cellular networks and IP addresses, etc.), information regarding availability (which may be derived from calendar data), time, day, weekday/weekend, preference settings for applications operating on device 102, etc.

At process 306, advertisement server 106*c* analyzes the state of movement data and additional data to make a determination as to a correlation of data (relating perhaps to a current state of mind) of device 102. For example, for the state of movement analysis, if server 106*c* determines that device 102 is moving at a speed over a given threshold (e.g. over at least 20 km/h), then server 106*c* may categorize the state of movement of device 102 as being within a vehicle, such as vehicle 120; if the speed is in a lower range (e.g. between 5 and 20 km/h), the state of movement may be categorized as being on a bicycle; if the speed is in a further lower range (e.g. between 0.1 and 5 km/h), the state of movement may be categorized as being walking, jogging, strolling etc.

Then, additional data may provide context may for the state of movement. For example, for device 102 in vehicle 120, server 106*c* may continue with an analysis to determine whether device 102 belongs to the driver of the vehicle 120. This may be performed, for example, by checking for information on the existence of a separate communication link, such as a Bluetooth (trade-mark) connection, between device 102 and vehicle 120. Additional time/day and location data may be analyzed. For example, if the time/day is a weekday, one context may be determined (e.g. at work). For example, if the time/day is a weekend, one context may be determined (e.g. at leisure). The day may also indicate a season (e.g. winter, spring, summer, fall). For example snowmobiling may be a deemed activity if the device is moving at a certain speed, the location is deemed to be in a field and the time is the winter. Other contexts that combine location, date and movement may be provided. Additionally or alternatively, device 102 may have an active (hardware/software) switch that the user may set to indicate that whether he is the driver or passenger. Exemplary states of movement for device 102 that may be identified by an embodiment based on an analysis of the movement data include the following Table A:

TABLE A

| Correlation of Data (State of Mind) | Exemplary context |
| --- | --- |
| Still | Device is on a desk and is not moving |
| Relatively Stationary | Device is on a person and the person is walking |
| Leisure Time | Device is on a person; device may or may not be moving; time of device is after 5 PM on weekday or anytime on weekend |
| Vacation | Device is on a person; device may or may not be moving; calendar application may indicate vacation for current time. |
| Social Situation | Device is on a person and it is proximate to another device; device may or may not be moving; time of device is after 5 PM |
| At Work | Device is on a person; device may or may not be moving; time of device is between 9 AM and 5 PM; GPS data may indicate that device is at office |
| At Work (in internal meeting) | Device is on a person and it is proximate to another device; device may or may not be moving; time of device is between 9 AM and 5 PM; GPS data may indicate that device is inside office; calendar application may indicate meeting at current time. |
| At Work (in external meeting) | Device is on a person and it is proximate to another device; device may or may not be moving; time of device is between 9 AM and 5 PM; GPS data may indicate that device is outside office |
| At Work (Lunchtime) | Device is on a person; device may or may not be proximate to another device; device may or may not be moving; time of device is between 11 AM and 1 PM; GPS data may indicate that device is outside office |

TABLE A-continued

| Correlation of Data (State of Mind) | Exemplary context |
| --- | --- |
| Amusement Park | Device is moving rapidly (e.g. between 40 km/h and 100 km/h) but the location is confined to a small area |
| Exercising | Running, cycling at predetermined speeds (e.g. between 2 and 25 km/h) |
| Driving | Movement at predetermined speeds (e.g. between 20 and 120 km/h) |
| Driving (off-road) | Movement at predetermined speeds (e.g. between 20 and 120 km/h) and location indicating an off-road position |
| Driving (on-road) | Movement at predetermined speeds (e.g. between 20 and 120 km/h) and location indicating an on-road position |
| On Train | Movement at predetermined speeds (e.g. between 60 and 120 km/h); location along predetermined railway routes |
| Light Aircraft | Movement at predetermined speeds (e.g. between 120 and 200 km/h); altitude data |
| Commercial Aircraft | Movement at predetermined speeds (e.g. over 200 km/h); altitude data, GPS |

It will be appreciated that the states in Table B are not exhaustive. Other combinations of various state of movement data and other data may be used to identify additional states of mind. Thresholds for any state of mind setting (for any movement data or additional data) may be customized to meet specific requirements.

In process 308, once a correlation of data and any context is determined for the user of device 102, server 106*c* selects an advertisement based on the correlated data and a format for the advertisement for device 102. For example, if it is determined that the device 102 is likely associated with a driver of a vehicle, advertisement server 106*c* may select an audio format of an advertisement for device 102. If the information from device 102 does not indicate a connection between the device and the vehicle, advertisement server 106*c* may use a derived speed value for device 102 to determine a context for an advertisement. For example, one or more preset speed thresholds may be set (for example, 50 km/h). If the speed of device 102 is determined to be higher than a given threshold, advertisement server 106*c* may determine that an audio format of an advertisement should be provided. If the speed of device 102 is lower than a given threshold, advertisement server 106*c* determine that a visual format or an audio-visual format of an advertisement should be provided. In one embodiment, advertisement 106*c* may send any type of advertisement (i.e. audio, visual, audio-visual) regardless of the speed of device 102. Finally, at process 310, the selected format of the advertisement is provided to device 102.

Another embodiment may use calendar application data associated with device 102 to determine a correlation of data for a device a) right now, and b) in the near future.

It will be appreciated that in other embodiments, one or more of the processes of FIG. 3 may be performed by applications that are remote to server 106*c*. For example, movement data analysis may be performed on device 102 and device 102 may simply provide a message to server 106*c* indicating its current state of movement.

Server 106*c* may have an associated database 122 that stores advertisements and formats. A table, (such as Table B below) may be created that provides a matrix of advertisement formats and conditions on which a particular format/advertisement is to be sent to a particular device 102. A given format for an advertisement may be composed of one or more different audio/visual components. An audio component may be a voice and/or music generated on a speaker of device 102. A visual component may be a static image, a video, a banner, text or any graphical element generated on a display of device 102.

TABLE B

| Advertisement | State of Mind of device 102 | | | | |
|---|---|---|---|---|---|
| | Driving | Passenger in Car | Walking | At Meeting | Leisure Time |
| Advertisement 1 | Audio only | Audio + Visual | Audio + Visual | SMS only | none |
| Advertisement 2 | Audio #1 only | Audio #2 only | Audio #2 only | Video only | none |
| Advertisement 3 | Audio only | Visual #1 | Audio + Visual | Audio + Visual | Audio + Visual |
| Advertisement 4 | Email only | Audio only | Audio + Visual | Image only | Email only |
| Advertisement 5 | SMS message only | SMS + Visual | Audio + Visual | Audio + Visual | Audio + Visual |
| Advertisement 6 | none | Audio + Visual | Audio + Visual | Audio + Visual | none |
| Advertisement 7 | voice mail | Visual only | Audio + Visual | email only | none |
| Advertisement 8 | none | none | Audio only | none | Audio + Visual |
| Advertisement 9 | Audio only | Audio only | Audio + Visual | Audio + Visual | Audio + Visual |
| Advertisement 10 | Audio + Visual #1 | Audio + Visual #2 | Audio + Visual #3 | | |
| Advertisement 11 | Audio only | Audio + Visual #2 | Visual only | none | none |
| Advertisement 12 | Audio + Visual | Audio + Visual | Audio only | | |

The data in Table B may be stored in database 122 and may be periodically updated. It can be seen that for the matrix, with some advertisements, some states of mind may have no advertisement provided. For example, if an advertisement is for a work related product or service, a format of an advertisement is provided only if the user is currently at a "work" state of mind. This may include being at an office or commuting. Alternatively, if an advertisement is for a product that is deemed to be of interest to the user (e.g. through data taken from the user's preferences set for device 102), then some format of that advertisement may always be provided to device 102. Following are some exemplary contexts for providing an advertisement to device 102 based on a determined state of mind for it.

As previously noted, server 106c may transmit certain formats of an advertisement to device 102 depending on the state of movement of device 102. For example, advertisement server 106c may transmit advertisement data to device 102 only if the received movement data indicates that device 102 is moving above a predetermined threshold speed (e.g. 20 km/h) and/or device 102 has been moving substantially continuously for a predetermined duration of time (e.g. 2 minutes). Another embodiment may use basic user-definable settings in an application operating on device 102 (or on a remote application communicating with device 102). Therein a set of (hardware/software) status conditions may be set for device 102 (e.g. device 102 is one of: moving, not moving, in a vehicle, in a train, in a plane, etc.) with sub-conditions (e.g. user of device 102 is one or more of: a driver, a passenger, a navigator, front seat passenger, rear seat passenger, associated with device 102c, not to be disturbed, available for any communications, only text advertisements, only audio advertisements, only video advertisements, allow rich content advertisements, only allow basic advertisements, etc.).

In another embodiment, a given format of an advertisement may be provided to device 102 depending on a determined relevance for device 102, based on the movement data and/or other status indicators and/or information associated with device 102. For example, using GPS location information of device 102, advertisement server 106c may identify an advertisement for device 102 promoting a retail outlet that device 102 is near offering a particular ware, service or event provided by the outlet. The direction of movement of device 102 may also be used (e.g. north, south, east, west, etc.). This direction information may be used to filter advertisements (e.g. if travelling north, then only provide advertisements for proximate entities that are on the east side of the street being travelled on). Advertisement server 106c may also select advertisement content based on the preferences of the user of device 102. The preferences of the user may be derived from a number of sources, including the user's device settings and subscriptions (e.g. Really Simple Syndication, Rich Site Summary, etc.), and the user's event history stored on device 102. For example, the user's preferences may indicate an interest in sports and, based on this information, advertisement server 106c may choose to send advertisements relating to sporting goods, services and events to the user's device 102.

In yet another embodiment, advertisement server 106c may utilize peer-identification information from device 102. For example, for vehicle 120, device 102 may be used by its driver. There may be multiple devices 102c, 102d, etc. also in vehicle 120 and device 102 may identify other nearby devices 102c, 102d, etc. by obtaining identification data from the nearby devices using RFID, Bluetooth (trade-mark) connection, or other communication links. Advertisement server 106c may request peer-identification from device 102. The data provided by device 102 may serve as a sufficient indicator for advertisement server 106c of the movement of peer devices 102c, 102d, etc. This may be useful in a situation where the peer devices have no movement detection capabilities. Using the peer-identification data, advertisement server 106c may selectively transmit advertisement data to peer devices 102c, 102d, etc. In a further embodiment, advertisement server 106c may synchronize the transmission of advertisement data to a group of devices 102, 102c, 102d, etc. travelling in the same vehicle 120, such that the devices in the group generate the same advertisement at the same time to their respective users. In a further embodiment, the synchronization of advertisement may differentiate between device 102 that belongs to the driver and the devices 102c, 102d of the passengers such that different formats of an advertisement are provided to the driver and the passengers. For example, the passenger devices may receive a format that includes a visual component of the advertisement, while the driver's device 102 would not receive the same visual component.

Status indicators may also be provided from settings stored in device 102 associated with a user's preferences. Such preferences can indicate any one or more of the following settings: current time zone, current home telephone number, preference for salutations (e.g. Ms./Mr., etc.), base font, base ring tone, base colour scheme for GUI, base communication enunciators, base communications preferences (e.g. Wi-Fi first, Wi-Fi only), etc. Any one or more of these indicator can be used to infer another state of mind for the user. Such preferences are typically provided in a user's GUI operating on device 102, allowing changes to be made thereto. An embodiment is provided with access to this data to perform a part of a correlation of data analysis.

Additional status indicators may be provided from data from applications operating on device 102. For example, a calendar application (described later) may provide current location and status information about a user of device 102. Similarly a GPS application may provide current location information about device 102. Data from other applications may be used. The applications may operate remotely to device 102 yet still provide a status indicator relating to device 102.

It will be appreciated that one or more of the above noted analyses may be combined, and weighted as a more detailed analysis of the current state of mind of the user of device 102.

It will be appreciated that functions and operations described above for device 102 (and server 106c) in FIGS. 2 and 3 may be reconfigured to be performed by its counterpart component (namely a function conducted by device 102 may be conducted on server 106c and vice versa) or on another component in system 100. Appropriate message and command structures may be provided to synchronize functions among the components.

In creating an advertisement format for distribution to device 102, server 106c may provide a command to another server to initiate a communication to device 102 that contains a message containing an advertisement destined for device 102. For example, if a format of an advertisement is as an email or voicemail, server 106c may send a command to server 106d or 106b to send a message containing text or a voice message containing the advertisement and request that server 106d or 106b send an appropriate message containing same to device 102.

It will be appreciated that in one embodiment, the advertisement server may provide these functions through software, hardware and/or firmware operating on or with its microprocessor. The interface server has a communication connection to the servers in the network; and a second communication link to the electronic device. The interface server may have a device communication module that, through instructions provided to the microprocessor, receives the request from the device for access to one or more services or servers; and generates and sends a response to the request for access to the device. The interface server may also have a server communication module to analyze a status of at least one capability of the electronic device; generate and send a set of access requests to a set of servers of the one or more services or servers that it can access; monitor for responses from the servers; extract access information from said the responses; and process the access information for the response for the device. The interface server produces the set of access requests from an analysis of said status of at the capabilities of the electronic device.

Once an analysis of the status of device 102 is complete, advertisement server 106c builds and sends individual advertisements to the device 102 and any peers.

In another embodiment, a "pull"-based advertisement system may be provided. Therein, one or more aspects of the movement analysis and advertisement analysis may be provided in whole or in part on device 102 and once the analysis is complete, device 102 may send a request for a specific format of an advertisement from server 106c.

Figure 4:
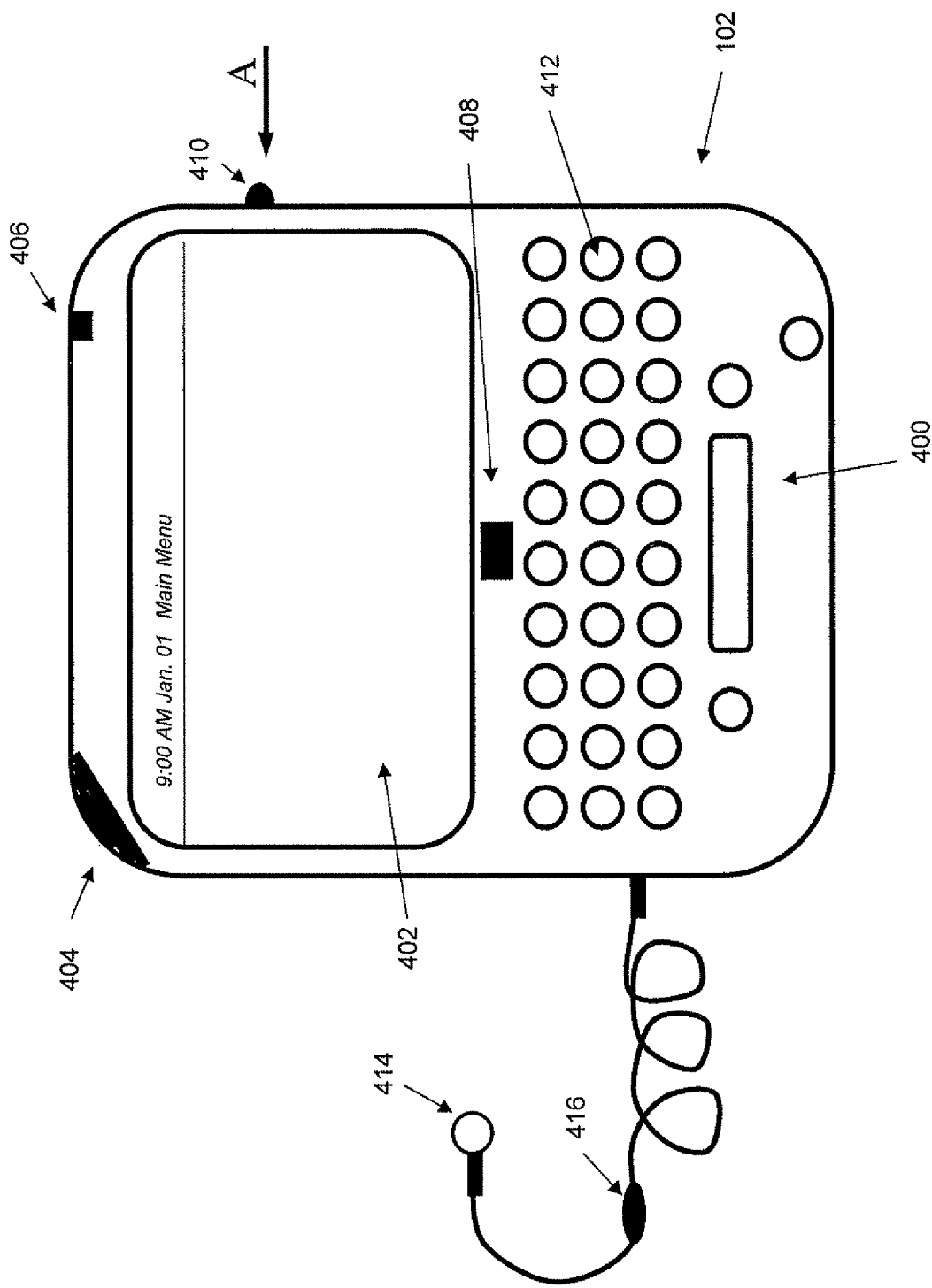
FIG. 4 is a schematic representation of the device of FIG. 1.

Further detail is now provided on components of device 102 that are related to processes relating to an embodiment. Referring to FIG. 4, electronic device 102 is based on a computing platform having functionality of an enhanced personal digital assistant with cellphone and e-mail features. It is, however, to be understood that electronic device 102 can be based on construction design and functionality of other electronic devices, such as smart telephones, desktop computers, pagers or laptops having telephony equipment. In a present embodiment, electronic device 102 includes a housing 400, an LCD 402, speaker 404, an LED indicator 406, touchpad 408, an ESC ("escape") key 410, keypad 412, a telephone headset comprised of an ear bud 414 and a microphone 416. Touchpad 408 and ESC key 410 can be inwardly depressed as a means to provide additional input to device 102. ESC key 410 may be depressed along the path of arrow "A". A trackball may be provided (not shown).

It will be understood that housing 400 can be made from any suitable material as will occur to those of skill in the art and may be suitably formed to house and hold all components of device 102.

Device 102 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Bluetooth (trade-mark) and the many forms of 802.11 wireless broadband, like 802.11a, 802.11b, 802.11g, etc. that support voice. Other embodiments include Voice over IP (VoIP) type streaming data communications that can simulate circuit-switched phone calls. Ear bud 414 can be used to listen to phone calls and other sound messages and microphone 416 can be used to speak into and input sound messages to device 102.

Figure 5:
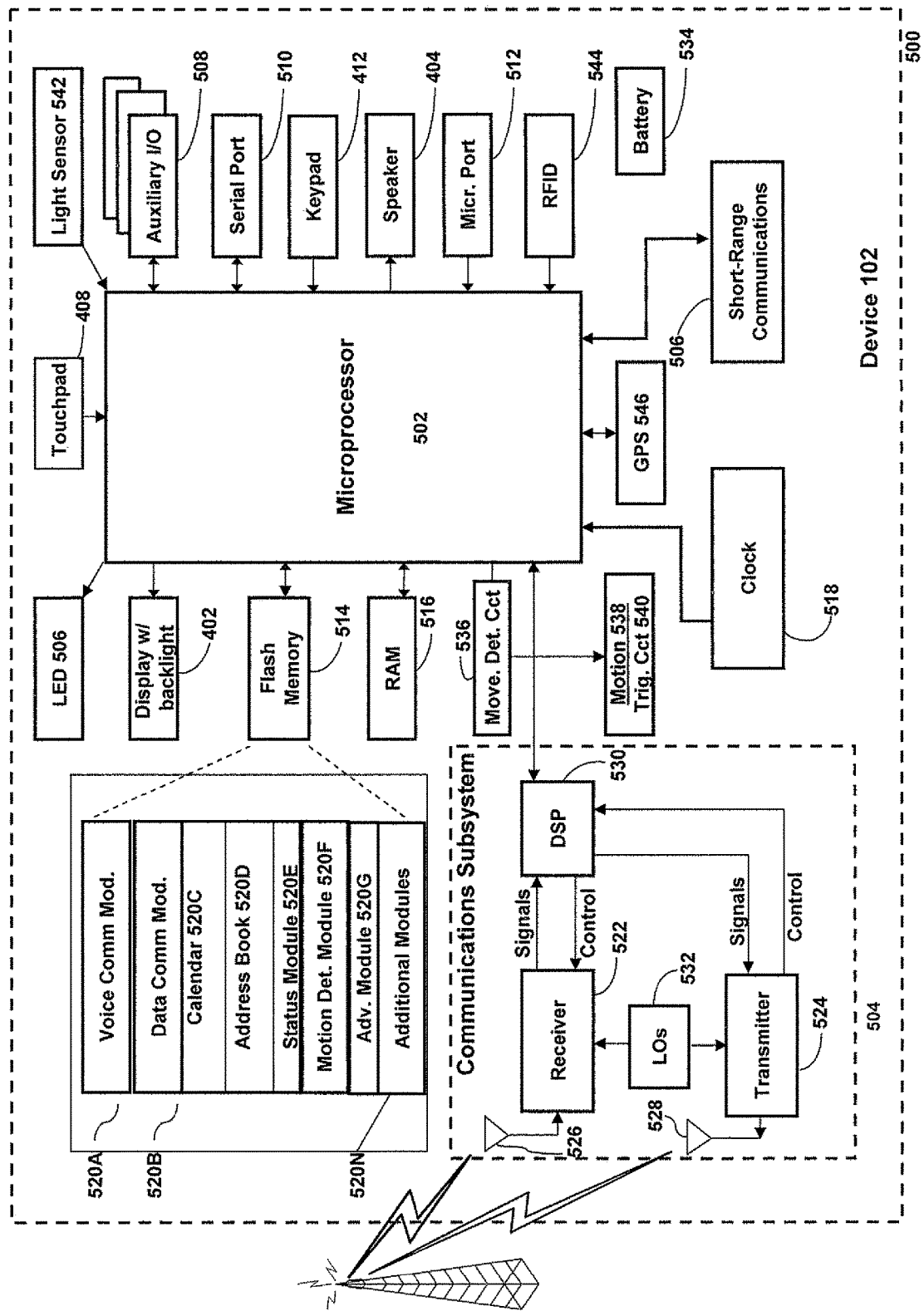
FIG. 5 is a block diagram of certain internal components of the device in FIG. 4.

Referring to FIG. 5, functional components of device 102 are provided in schematic 500. The functional components are generally electronic, structural or electro-mechanical devices. In particular, microprocessor 502 is provided to control and receive almost all data, transmissions, inputs and outputs related to device 102. Microprocessor 502 is shown schematically as coupled to keypad 412 and other internal devices. Microprocessor 502 preferably controls the overall operation of the device 102 and its components. Exemplary microprocessors for microprocessor 502 include microprocessors in the Data 950 (trademark) series, the 6200 series and the PXA900 series, all available at one time from Intel Corporation. Microprocessor 502 is connected to other elements in device 102 through a series of electrical connections to its various input and output pins. Microprocessor 502 has an IRQ input line which allows it to receive signals from various devices. Appropriate interrupt firmware is provided which receives and reacts to the signals detected on the IRQ line.

In addition to the microprocessor 502, other internal devices of the device 102 are shown schematically in FIG. 5. These include: display 402; speaker 404; keypad 412; communication sub-system 504; short-range communication sub-system 506; auxiliary I/O devices 508; serial port 510; microphone port 512 for microphone 416; flash memory 514 (which provides persistent storage of data including local data relating to the status flags used by an embodiment); random access memory (RAM) 516; clock 518 and other device sub-systems (not shown). Device 102 is preferably a two-way radio frequency (RF) communication device having voice and data communication capabilities. In addition, device 102 preferably has the capability to communicate with other computer systems via the Internet. Device 102 may have a SIM card (not shown).

Operating system software executed by the microprocessor 502 is preferably stored in a computer-readable medium, such as flash memory 514, but may be stored in other types of memory devices, such as read-only memory (ROM) or similar storage element. In addition, system software, specific device applications, or parts thereof, may be temporarily loaded into a volatile store, such as RAM 516. Communication signals received by the mobile device may also be stored to RAM 516.

Microprocessor 502, in addition to its operating system functions, enables execution of software applications on device 102. A set of software (or firmware) applications, generally identified as applications 520, that control basic device operations, such as voice communication module 520A and data communication module 520B, may be installed on the device 102 during manufacture or downloaded thereafter. Calendar application 520C and address book application 520D provide useful tracking tools for the user of device 102. Data from the calendar application 520C may be used in an embodiment to determine a context for a state of movement for device 102 and may be used to infer where the user will be in the near future, and what his state of mind will be in the near future. Status module 520E monitors and evaluates the status of various capabilities of device 102 (e.g. its communication connections, battery power, available memory) and updates data stored on device 102 with this information. Module 520E may also generate and send communications to external devices (such as interface server 108) regarding this information on a periodic basis or as statuses change. Module 502E may combine calendar application data with the other sources of information to produce a refined view of the device's activity state, both now and in the future. Module 520E may provide all or part of a "correlation data" and/or "state of mind" analysis of device 102 using data from any application 520 operating on device 102, such as an email application, SMS text application, Instant Messaging application and a telephone application. Movement detection module 520F receives data from various components of device 102, such as movement detection circuit 536, motion circuit 538 and trigger circuit 540, GPS module 645, RFID module 544, communication module 504, short-range communication sub-system 506, time and calendar data, etc. The data collectively can be used to determine whether device 102 is moving, the direction of movement, the speed of the movement, the location of device and what type of terrain the device is on (roads, railways, water, off-road, etc.). Override (hardware/software) data and switch settings may also be used to determine the status of device 102. Module 520F may provide status messages to server 106c or other external devices, based on received requests or changes in movement status. Module 520F may impose thresholds on the movement data before sending such status messages. Module 520F may generate and send communications to external devices (such as interface server 108 or server 106c) regarding this data on a periodic basis, on a per-request basis, or as the device's movement changes. Advertisement processing module 520G receives and extracts any components of advertisements provided to device 102 and provides the components to the proper output devices (e.g. display 402, speaker 404). If a component of an advertisement is provided as an email, then data communication module 520B will process same. As well, additional software modules, such as software module 520N, which may be for instance a personal information manager (PIM) application, may be installed during manufacture or downloaded thereafter into device 102. Data associated with each application can be stored in flash memory 514.

Data communication module 520B may comprise processes that implement features, processes and applications for device 102 as provided and described earlier, allowing device 102 to generate track status of various components of device 102 and to generate and send messages to external devices (such as interface server 108).

Communication functions, including data and voice communications, are performed through the communication sub-system 504 and the short-range communication sub-system 506. Collectively, sub-systems 504 and 506 provide the signal-level interface for all communication technologies processed by device 102. Various applications 520 provide the operational controls to further process and log the communications. Communication sub-system 504 includes receiver 522, transmitter 524 and one or more antennas, illustrated as receive antenna 526 and transmit antenna 528. In addition, communication sub-system 504 also includes processing modules, such as digital signal processor (DSP) 530 and local oscillators (LOs) 532. The specific design and implementation of communication sub-system 504 is dependent upon the communication network in which device 102 is intended to operate. For example, communication sub-system 504 of device 102 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 102. In any event, communication sub-system 504 provides device 102 with the capability of communicating with other devices using various communication technologies, including instant messaging (IM) systems, text messaging (TM) systems and short message service (SMS) systems.

In addition to processing communication signals, DSP 530 provides control of receiver 522 and transmitter 524. For example, gains applied to communication signals in receiver 522 and transmitter 524 may be adaptively controlled through automatic gain-control algorithms implemented in DSP 530.

Short-range communication sub-system 506 enables communication between device 102 and other proximate systems or devices, which need not necessarily be similar devices. For example, the short-range communication sub-system may include an infrared device and associated circuits and components, or a Bluetooth (trade-mark) communication module to provide for communication with similarly enabled systems.

Powering the entire electronics of the mobile handheld communication device is power source 534. In one embodiment, the power source 534 includes one or more batteries. In another embodiment, the power source 534 is a single battery pack, especially a rechargeable battery pack. A power switch (not shown) provides an "on/off" switch for device 102. A power source interface (not shown) may be provided in hardware, firmware, software or a combination of such elements to selectively control access of components in device 102 to power source 534. Upon activation of the power switch an application 520 is initiated to turn on device 102. Upon deactivation of the power switch, an application 520 is initiated to turn off device 102. Power to device 102 may also be controlled by other devices and by software applications 520. Other components in device 102 include light sensor 542. RFID module 544 may include an RFID transponder and/or an RFID reader.

Figure 6:
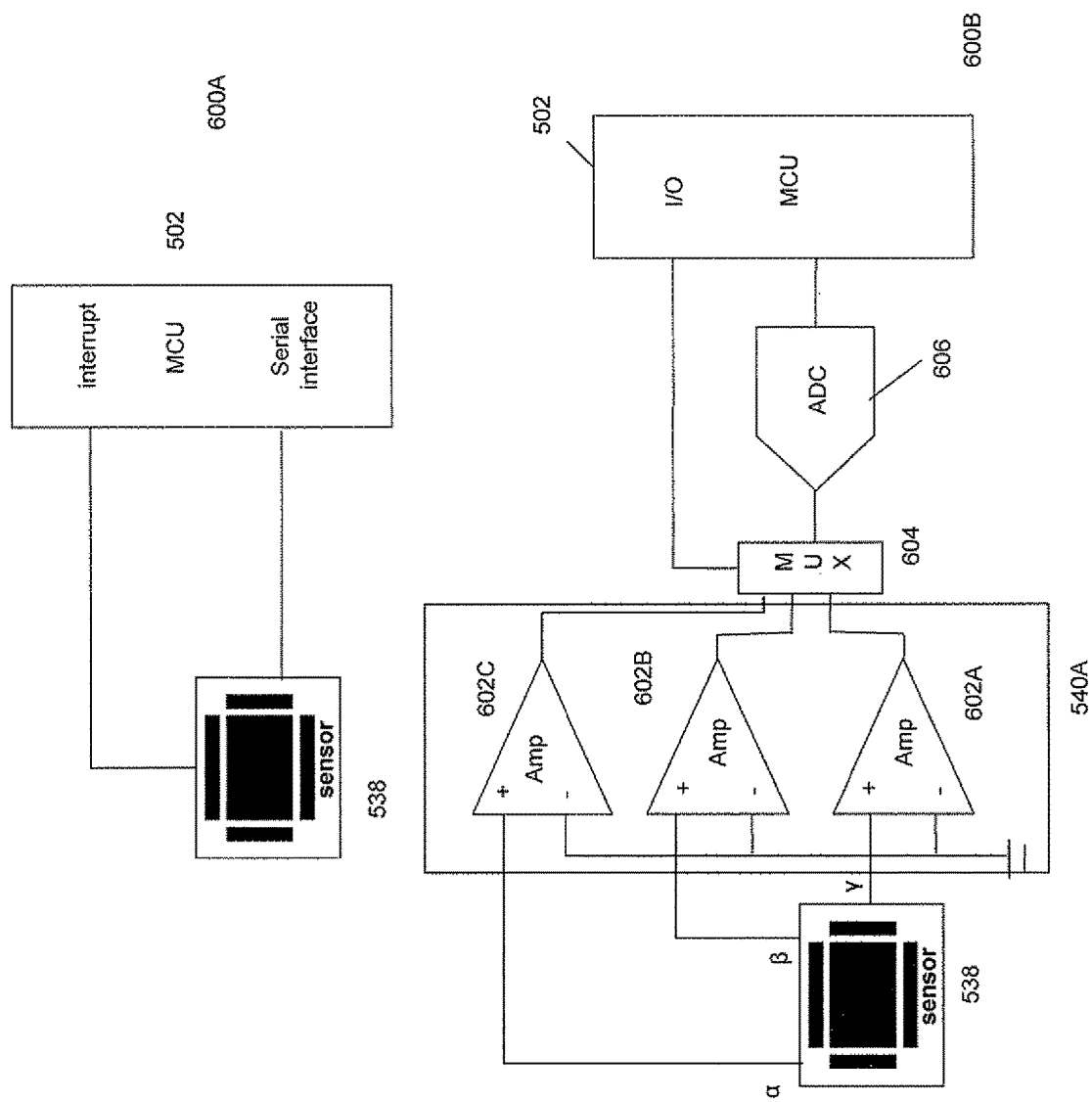
FIG. 6 is a block diagram of two movement detection systems of in the device of FIG. 1.

Referring to FIG. 6, with some algorithms of an embodiment described, further detail is provided on how aspects of the embodiment are implemented in device 102 through movement detection circuit 536 and its related components. Therein, two sensors arrangements for device 102 are shown. Circuit 600A shows sensor 538 directly connected to the interrupt and serial interface input lines of microprocessor 502. Accordingly, software operating on microprocessor 502 is provided to selectively monitor signal(s) from sensor 538 to determine when movement of device 102 has been detected. The circuit between sensor 538 and microprocessor 502 can be considered to be one version of circuit 536. Software operating on microprocessor 502 determines when a notable signal has been generated by sensor 238. Circuit 600B shows sensor 538 connected to trigger circuit 540A having two differential comparators 602A and 602B, which then have their outputs attached to an analog mux 604. The mux selectively provides its output according to a control signal generated by microprocessor 502. The analog output of mux 604 is converted to a set of digital signals by analog to digital converter 606, which then provides the output to microprocessor 502. As with other implementation, software operating on microprocessor 502 determines when a notable signal has been generated by sensor 538. Reading of positions determined by the software can be stored in memory 514 or 516. The software can also create an average reading of the movement readings. This average reading can be used to determine when device 102 is in a resting position or when it is effectively in a resting position (e.g. it is being moved only in inconsequential amounts).

For any embodiment, a low-g MEMS (micro-electromechanical system) accelerometer may be used for motion sensor 538. Further, the accelerometer may be of almost any type, including a capacitive, piezoelectric, piezoresistive, or a gas-based accelerometer. An exemplary low-g MEM accelerometer is a LIS302DL tri-axis digital accelerometer, available from STMicroelectronics of Geneva, Switzerland. Accelerometers sense and convert an acceleration detected from a motion (e.g. tilt, inertial, or vibration) or gravity into an electrical signal (producing a corresponding change in output) and are available in one, two or three axis configurations. Accelerometers may produce digital or analog output signals.

Since an accelerometer detects a change in velocity, in order to use an accelerometer to detect a certain speed, signals from an accelerometer may be used to detect velocity changes, which are then analyzed to determine whether an underlying given (average) speed is associated with the changes. In a moving vehicle, for example, as the device is moving, different accelerations may be detected as the vehicle speeds up (perhaps from a stop), slows down (perhaps to a stop) and turns corners during the driving. These velocity changes can be mapped against predetermined speed levels which then can be used to select given formats of advertisements, for example as provided in Table A.

To improve sensitivities of an accelerometer when it is used as motion sensor 538, its outputs can be calibrated to compensate for individual axis offset and sensitivity variations. Calibrations can also be performed at the system level, providing end-to-end calibration. Calibrations can also be performed by collecting a large set of measurements with the device in different orientations.

Figure 7:
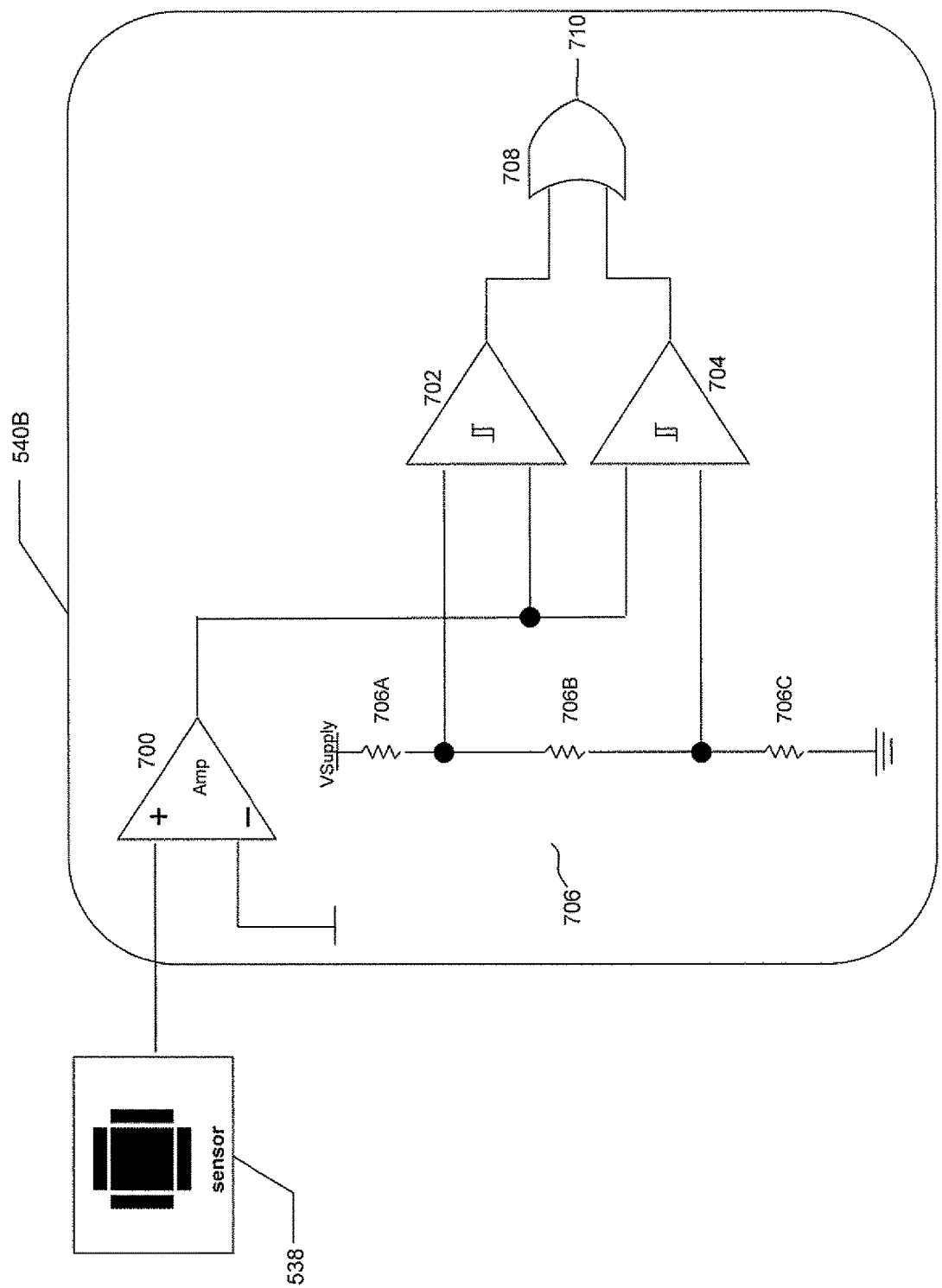
FIG. 7 is a block diagram of an alternative movement detection system of in the device of FIG. 1.

Referring to FIG. 7, an alternative circuit 540B is shown for sensor 538 which is aligned as a single axis analog sensor. Sensor 538 can be oriented such that its output detects movement along a desired axis (e.g. 'Z' axis detecting when device moved vertically). Additional axes may be monitored by replicating circuit 540B for each additional axis. Briefly, the output of sensor 538 is provided to buffer amp 700. The output of buffer amp 700 is provided in tandem to comparators 702 and 704. The other inputs of comparators 702 and 1204 are taken from different taps on resistor ladder 706, comprising resistors 706A, 706B and 706C. Comparators 702 and 704 each produce upper and lower limit comparison signals for the output of sensor 538. If the value of the signal from sensor 538 is either above the upper limit set by the parameters of comparator 702 (comparing the signal from sensor 538 against its tap from the resistor ladder 706) or below the lower limit set by the parameters of comparator 704 (comparing the signal from sensor 538 against its tap from the resistor ladder 706) then OR gate 708 generates a trigger signal 1210. It will be appreciated that the limits can be used to define a range of signals detected by sensor 538 representing when be device 102 is either stationary (e.g. at rest) or being moved.

It will be appreciated that other circuits using different combinations of sensors and triggering components and threshold detectors may be used to provide functionalities of sensor 538 and circuit 540.

In other embodiments, motion sensor 538 may be substituted or combined with a different device, such as a spring-loaded switch, a tilt switch, a gyroscope, a mercury switch, GPS module 546 or any other device which can generate a signal responsive to movement or change in orientation of device 102. It is preferable that the device have low quiescent power draw characteristics.

Now, further detail is provided on features of server 106c. Referring to FIG. 8, general features of server 106c for processing electronic communications in accordance with an embodiment are shown. In an embodiment, server 106c is based on a general purpose computing platform. It may have the form factor of a desktop or laptop computer. It may be a minicomputer. In a present embodiment, computer 106c includes main processing station 800. Internally, server 106c has microprocessor 802 and memory 804. Connection ports 806 provides one communication connection system to allow server 106c to connect to with network 104, providing access to device 102 and other devices. Applications 808 are software that execute on microprocessor 802 and may be stored in memory 804 as database 122. Advertisements for advertisement campaigns and their associated attribute data may be stored in database 122.

Applications 808 control basic operations of computer 116, including ports 806. Connection module 808A provides the connection-level communication between server 106c and other elements in network 104, such as interface server 108 to ultimately allow access to processing of emails, IMs, data and other data transmission through server 108. Correlation data analysis module 808B initiates requests data to determine a state of mind of the user of device 102. One component analyzes the movement data of device 102. Application 808B receives movement data from device 102 and analyzes the movement data to determine a state of movement for device 102. Module 808B also sends a request for one or more status indictors relating to device 102. The status indicators may be provided through data associated with an application 520 operating on device 102. It will be appreciated that a correlation data analysis may be conducted by one or more modules in server 106c and device 102. When advertisements are selected by server 106c, device 102 may perform a correlation of data analysis or may provide relevant data (position, movement, near-future calendar entries, current communication links, etc.) to server 106c, wherein server 106c performs the correlation of data analysis. Once a state of mind for a user of device 102 is determined, advertisement selection module 808C selects and sends an advertisement to device 102 based on trigger conditions (per Table B) and the correlation of data results provided by module 808B. Additionally, advertisements may be sent to device 102 depending on other scheduling and trigger conditions. Module 808B may initiate a command destined for another application server 106 (such as email server 106d or voice mail server 106b) to send a message containing a provided advertisement to device 102. As such, applications 808A-C execute processes for server 106c as described in FIG. 3.

In another embodiment, devices in a network may periodically send "state of mind" data to advertisement server 106c. Server 106c may use that data as criteria to select appropriate advertisements.

The embodiments have been described for a system that provides an interface server to provide intermediary processing of communications between a device and servers in a network. It will be appreciated that embodiments may implement the features in any communication protocol or system. It will be appreciated that any features of interface server as described herein may be incorporated into a device or a component of another server in network 104.

It will be appreciated that a system and method in accordance with an embodiment can address a technical problem of how to provide a media to a mobile telecommunication device within a mobile telecommunication network through a push or pull mechanism. By correlating data about the device (and/or about its associated user) with a database of media, an embodiment may enable the specific distribution of appropriate data item(s) to the device. This selective targeting of content may provide a reduction in the overall traffic within the network as it obviates the need to push (or pull) data items to all devices operating in the network, rather data items are distributed to those devices whose attributes have a matching correlation of data to particular parameters for the media. Furthermore, the correlation of data for the devices may further provide reduction in traffic within the network as the data items that are pushed (or pulled) are pre-filtered prior to their distribution to targeted mobile devices.

It will be appreciated that the embodiments relating to devices, servers and systems may be implemented in a combination of electronic hardware, firmware and software. The firmware and software may be implemented as a series of processes, applications and/or modules that provide the functionalities described herein. The algorithms and processes described herein may be executed in different order(s). Interrupt routines may be used. Data may be stored in volatile and non-volatile devices described herein and may be updated by the hardware, firmware and/or software. Other network embodiments may use non-client server architectures for management of communications.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

The present disclosure is defined by the claims appended hereto, with the foregoing description being merely illustrative of embodiments of the present disclosure. Those of ordinary skill may envisage certain modifications to the foregoing embodiments which, although not explicitly discussed herein, do not depart from the scope of the present disclosure, as defined by the appended claims.

The invention claimed is:

1. A method for distributing electronic advertisement content, the method comprising:
storing, by an advertisement server, a plurality of formats of an advertisement, the plurality of formats comprising an audio format, a visual format, and an audio-visual format;
associating, by the advertisement server, each of the plurality of formats with a corresponding correlation of data;
receiving, by the advertisement server from a first electronic device, a status indicator indicating an active wireless communication link exists between the first electronic device and a second electronic device;
determining, by the advertisement server, that the first electronic device is associated with a driver of a vehicle;
determining, by the advertisement server based on the status indicator, a correlation of data;
identifying, by the advertisement server, a second format of the advertisement from the plurality of formats based on the correlation of data; and
transmitting, by the advertisement server to the second electronic device, the advertisement in the second format.

2. The method of claim 1, wherein a user of the second electronic device is a passenger of the vehicle.

3. The method of claim 1, further comprising transmitting, by the advertisement server to the first electronic device, the advertisement in a first format, wherein the first format comprises the audio format, and wherein the second format comprises the audio-visual format.

4. The method of claim 1, wherein determining that the first electronic device is associated with the driver comprises determining that a speed of the first electronic device exceeds a threshold.

5. The method of claim 1, wherein determining that the first electronic device is associated with the driver comprises identifying a communication connection between the first electronic device and the vehicle.

6. The method of claim 4, wherein the speed is determined based on movement data comprising data from one or more of an accelerometer, a global positioning system (GPS) sensor, or communication strength signals.

7. The method of claim 1, wherein the correlation of data comprises a user of the second electronic device being a passenger of the vehicle.

8. A system for distributing electronic advertisement content, the system comprising:
a memory storing instructions;
a processor in communication with the memory and configured to execute the instructions to cause the system to:
store a plurality of formats of an advertisement, the plurality of formats comprising an audio format, a visual format, and an audio-visual format;

associate each of the plurality of formats with a corresponding correlation of data;
receive, from a first electronic device, a status indicator indicating an active wireless communication link exists between the first electronic device and a second electronic device;
determine that the first electronic device is associated with a driver of a vehicle;
determine, based on the status indicator, a correlation of data;
identify a second format of the advertisement from the plurality of formats based on the correlation of data; and
transmit, to the second electronic device, the advertisement in the second format.

9. The system of claim 8, wherein the instructions further cause the system to determine that the first electronic device is associated with the driver when a speed of the first electronic device exceeds a threshold.

10. The system of claim 9, wherein the speed is determined based on movement data comprising data from one or more of an accelerometer, a global positioning system (GPS) sensor, or communication strength signals.

11. The system of claim 8, wherein the correlation of data comprises a user of the second electronic device being a passenger of the vehicle.

12. The system of claim 8, wherein the instructions further cause the system to transmit the advertisement in a first format comprising the audio format to the first device, and wherein the second format comprises the audio-visual format.

13. The system of claim 8, wherein the instructions further cause the system to determine that the first electronic device is associated with the driver if a communication connection is identified between the first electronic device and the vehicle.

14. A computer program product comprising instructions embodied on a non-transitory computer readable storage medium, wherein the instructions, when executed by a processor, cause an advertisement server to:
store a plurality of formats of an advertisement, the plurality of formats comprising an audio format, a visual format, and an audio-visual format;
associate each of the plurality of formats with a corresponding correlation of data;
receive, from a first electronic device, a status indicator indicating an active wireless communication link exists between the first electronic device and a second electronic device;
determine that the first electronic device is associated with a driver of a vehicle;
determine, based on the status indicator, a correlation of data;
identify a second format of the advertisement from the plurality of formats based on the correlation of data; and
transmit, to the second electronic device, the advertisement in the second format.

15. The computer program product of claim 14, wherein instructions further cause the advertisement server to determine that the first electronic device is associated with the driver when a speed of the first electronic device exceeds a threshold.

16. The computer program product of claim 15, wherein the speed is determined based on movement data comprising data from one or more of an accelerometer, a global positioning system (GPS) sensor, or communication strength signals.

17. The computer program product of claim 14, wherein the correlation of data comprises a user of the second electronic device being a passenger of the vehicle.

18. The computer program product of claim 14, wherein a user of the second electronic device is a passenger of the vehicle.

19. The computer program product of claim 14, wherein the instructions further cause the advertisement server to transmit the advertisement in a first format comprising the audio format to the first electronic device, and wherein the second format comprises the audio-visual format.

20. The computer program product of claim 14, wherein the instructions further cause the advertisement server to determine that the first electronic device is associated with the driver if a communication connection is identified between the first electronic device and the vehicle.

* * * * *